(12) United States Patent
Seo et al.

(10) Patent No.: US 9,601,143 B1
(45) Date of Patent: Mar. 21, 2017

(54) DISTURBANCE OBSERVER WITH ENERGY REDUCING FILTER

(71) Applicant: Seagate Technology LLC, Cupertino, CA (US)

(72) Inventors: Sangbo Seo, Yongin-si (KR); Sung Won Park, Yongin (KR)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/839,501

(22) Filed: Aug. 28, 2015

(51) Int. Cl.
*G11B 21/10* (2006.01)
*G11B 5/596* (2006.01)
*G11B 20/10* (2006.01)

(52) U.S. Cl.
CPC .... *G11B 5/59694* (2013.01); *G11B 20/10046* (2013.01)

(58) Field of Classification Search
None
See application file for complete search history.

(56) References Cited

U.S. PATENT DOCUMENTS

| | | | |
|---|---|---|---|
| 6,493,172 B1 | 12/2002 | Morris et al. | |
| 6,590,734 B1* | 7/2003 | Ell | G11B 5/5552 360/78.05 |
| 6,724,563 B2 | 4/2004 | Kobayashi et al. | |
| 7,292,403 B2 | 11/2007 | Baek et al. | |
| 7,319,570 B2 | 1/2008 | Jia et al. | |
| 7,679,856 B2 | 3/2010 | Ishiguro | |
| 8,031,566 B2* | 10/2011 | Park | G11B 7/08511 369/112.01 |
| 8,446,687 B2 | 5/2013 | Hironaka et al. | |
| 8,467,144 B2* | 6/2013 | Lim | G11B 5/5552 360/78.05 |
| 9,053,726 B1* | 6/2015 | Kim | G11B 5/59622 |
| 9,269,386 B1* | 2/2016 | Xi | G11B 5/59694 |
| 2013/0194697 A1 | 8/2013 | Hironaka | |

* cited by examiner

*Primary Examiner* — K. Wong
(74) *Attorney, Agent, or Firm* — Hall Estill Attorneys at Law (57) ABSTRACT

Disturbance rejection in a closed loop multi-actuator system. In some embodiments, a first disturbance observer (DOB) circuit is configured to inject a first disturbance rejection signal into an input control signal of a first stage of a multi-stage actuator. A second DOB circuit is configured to concurrently inject a second disturbance rejection signal into an input control signal of a second stage of the multi-stage actuator. Each of the first and second DOB circuits includes a band pass filter and an energy reducing filter. In some embodiments, the energy reducing filter has at least one notch filter and at least one anti-notch filter. In other embodiments, the energy reducing filter is a low-pass filter (LPF).

20 Claims, 13 Drawing Sheets

DISTURBANCE OBSERVER WITH ENERGY REDUCING FILTER

SUMMARY

Various embodiments of the present disclosure are generally directed to an apparatus and method for multi-stage closed loop control, and more particularly, to a disturbance rejection system for a multi-stage actuator.

In some embodiments, a first disturbance observer (DOB) circuit is configured to inject a first disturbance rejection signal into an input control signal of a first stage of a multi-stage actuator. A second DOB circuit is configured to concurrently inject a second disturbance rejection signal into an input control signal of a second stage of the multi-stage actuator. Each of the first and second DOB circuits includes a band pass filter and an energy reducing filter. In some embodiments, the energy reducing filter has at least one notch filter and at least one anti-notch filter. In other embodiments, the energy reducing filter is a low-pass filter (LPF).

In further embodiments, a data storage device has a voice coil motor (VCM) and a microactuator (uA) configured to position a data transducer adjacent a recording medium. A VCM controller circuit is configured to a VCM control input signal for the VCM, and a uA controller circuit is configured to generate a uA control input signal for the uA. A VCM disturbance observer (DOB) circuit is configured to inject a first disturbance rejection signal into the VCM control input signal to compensate disturbance components in a combined position signal generated by the VCM and the uA. The VCM DOB circuit includes a first band pass filter in series with a first energy reducing filter that reduces error sensitivity of the combined position signal induced by the first band pass filter. A uA disturbance observer (DOB) circuit is configured to inject a second disturbance rejection signal into the uA control input signal to compensate disturbance components in the combined position signal. The uA DOB circuit has a second band pass filter in series with a second energy reducing filter that reduces error sensitivity of the combined position signal induced by the second band pass filter.

In still further embodiments, a method includes providing a multi-stage actuator having at least first and second actuator stages; designing a disturbance observer (DOB) circuit for each stage to compensate for disturbance error in a combined position signal from the first and second stages by selecting a band pass filter to pass frequency values of interest in the combined position signal and by selecting an energy reducing filter in series with the band pass filter to reduce an increase in an error sensitivity function response induced by the band pass filter; and programming a programmable controller to implement the DOB circuit during operation of the multi-stage actuator.

These and other features and aspects of various embodiments can be understood from a review of the following detailed description and the accompanying drawings.

DETAILED DESCRIPTION

Various embodiments of the present disclosure are generally directed to multi-input multi-output (MIMO) closed loop control systems, and more particularly, to a disturbance rejection solution for a multi-stage actuation system such as, but not limited to, the type used in a data storage device servo control system.

Data storage devices are used to store and retrieve computerized data in a fast and efficient manner. Some data storage devices such as hard disc drives (HDDs) utilize a disc stack of one or more rotatable magnetic recording discs. The rotating discs are accessed by a corresponding array of data read/write transducers. Data are written to the recording surfaces of the discs by the transducers in fixed sized data sectors along concentric data tracks. A closed loop digital servo control system is used to control the position of the transducers adjacent the tracks.

Modern HDD applications are finding their way into new consumer applications, which present challenges due to time varying and higher frequency content environmental conditions. As the storage capacity of HDDs continues to increase, so does the track density which places tighter constraints on the servo control system. With tracks placed closer together in the radial direction, there is a need to increase positioning accuracy by the servo control system. Additionally, as the base plates and top covers that form the HDD enclosure become thinner, so does the need for more precise positioning control when track following in the presence of external vibration.

Vibration rejection can be provided in the form of a disturbance observer (DOB) model which applies a feedforward technique to estimate and cancel out disturbances experienced during transducer positional control. While DOB techniques have been found operable in control systems where a single actuator (e.g., a voice coil motor, VCM) is used, undesired imbalance problems relating to the so-called waterbed effect can arise in multi-stage applications where multiple actuators (such as a VCM and a microactuator, uA), are used. Generally, the waterbed effect operates to improve frequency response of the control loop in one frequency range of interest, but induces a degradation of frequency response in another frequency range of interest, much like pressing down on a waterbed in one location causes another portion of the bed to rise. It is believed that one reason such imbalances occur is the fact that the position error signal (PES) used to indicate position error includes both VCM and uA components.

Accordingly, various embodiments of the present disclosure are generally directed to a closed loop control system for a multi-stage actuator, such as but not limited to the type used to control the position of a data transducer a rotating data recording surface in a data storage device.

As explained below, in some embodiments an apparatus includes a multi-stage actuator having at least first and second stages. The first stage may be a VCM and the second stage may be a uA. A primary stage disturbance observer generates a first disturbance rejection signal which is injected into an input control signal of the first stage. A secondary stage disturbance observer concurrently generates a second disturbance rejection signal which injected into an input control signal of the second stage.

Each of the primary and secondary stage disturbance observers have a first filter block, which may take the form of a band-pass filter (BPF) adapted to pass a selected frequency component of interest of a position error signal (PES). Each of the observers may further include a second filter block downstream in series with the first filter block, the second filter block configured as an energy reducing block to reduce an increase in error sensitivity induced by the first filter block.

In some embodiments, the energy reducing block may be arranged in the form of a notch filter. In other embodiments, the energy reducing block may be arranged in the form of a low pass filter. In further embodiments, multiple energy reducing blocks may be arranged in series and one or more anti-notch filters may be added to boost the error sensitivity function response in selected frequency ranges.

In this way, a disturbance observer (DOB) design can be implemented in a circuit to reject a wide range of unpredictable and time varying vibrational inputs and maintain controlled positioning of the control object. The system is particularly suited to provide disturbance rejection in vibration environments that involve changing and unpredictable frequency components. Compensation values are provided to respective elements of the multi-stage actuator system, such as separate compensation values being injected into control inputs supplied to a VCM and to a uA. The control scheme endeavors to minimize (reduce) non-repeatable run out (NRRO) of a position error signal (PES) caused by rotational (angular) and/or linear (translational) vibration applied to the data storage device (or other control system).

Figure 1:
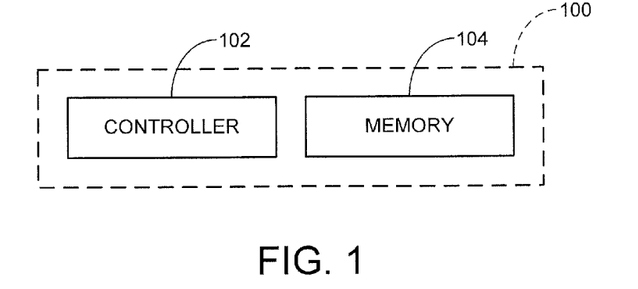
FIG. 1 illustrates a data storage device in accordance with various embodiments of the present disclosure.

These and other features and advantages of various embodiments can be understood beginning with a review of FIG. 1 which provides a simplified functional block diagram of a data storage device 100 in accordance with various embodiments. It will be appreciate that the use of a data storage environment is merely exemplary and is not limiting, as the various embodiments disclosed herein can be readily adapted to any number of different types of multi-stage actuator control systems wherein multiple (e.g., two or more) actuation stages are used to nominally position a control object, of substantially any type, adjacent a target position. In the context of a data storage device, it will be appreciated that the control object may be a data read/write transducer which is positioned adjacent a target track or other target radial location on an adjacent data recording medium surface.

The exemplary data storage device 100 of FIG. 1 includes a controller 102 and a memory module 104. The controller 102 may take the form of a hardware based controller or a software/firmware based programmable processor that utilizes programming steps stored in a suitable memory location to carry out top level control functions for the device 100. The memory module 104 may take any number of suitable forms, including rotatable media, solid-state semiconductor memory, etc.

Figure 2A:
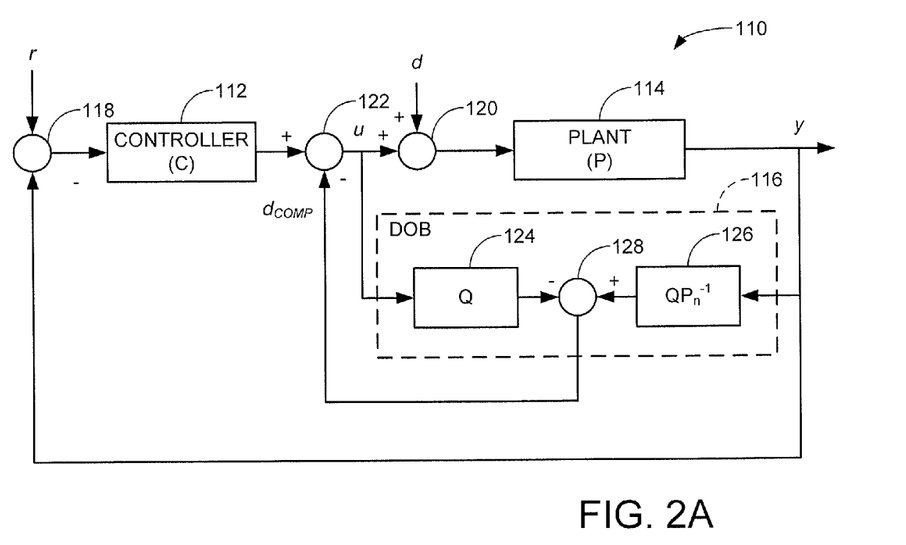
FIG. 2A is a control diagram for a single stage closed loop servo control circuit of the device of FIG. 1 in accordance with some embodiments.

FIG. 2A shows a functional block representation of a closed loop control system 110 for a data storage device corresponding to FIG. 1 in some embodiments. The system 110 includes a controller (C) 112, a plant (P) 114, and a disturbance observer (DOB) 116. The controller 112 may be incorporated into the controller 102 and may be realized in hardware and/or firmware (including one or more programmable processors that utilize associated programming in memory).

The plant 104 generally corresponds to aspects of the memory module 104 and may include a data transducer that is positioned adjacent a rotatable magnetic recording medium, as well as an actuator stage (such as a voice coil motor, VCM) that controllably positions the transducer responsive to inputs u supplied by the controller 112. The plant 104 outputs a position signal y that is fed back to the controller 112 to provide closed loop positional control. In some cases, a position error signal (PES) may be generated, such as by determining the difference via summing junction 118 between the position signal y and a reference (commanded) position r.

Disturbances d are introduced to the system which introduces error in the position of the control object of the plant (e.g., transducer). These are shown to be injected at summing junction 120, and introduce error in the positioning of the control object. The DOB 116 compensates for such disturbances by estimating the disturbances d based the plant output y and generating a disturbance compensation signal $d_{COMP}$ that is injected into the output of the controller 112 at summing junction 122. Ideally, the disturbance compensation signal cancels out the effects of the applied disturbance signal.

The DOB 116 includes a Q filter block 124 and an inverted plant model (QPn-1) block 126. The Q filter block 124 removes high frequency content from the observed disturbance signal. The inverted plant model block 126 provides a transfer function model selected to be an inverse of a transfer function related to the plant. The output from block 124 is subtracted from the output of block 126 via summing junction 128 to generate the disturbance compensation signal. Generally, the system operates as follows:

$$y = \frac{PP_n}{P_n + Q(P - P_n)} u + \frac{(1-Q)PP_n}{P_n + Q(P - P_n)} d \quad (1)$$

It can be seen that if Q nominally equals unity (Q=1), then y will be the product of P and u (y=Pu). This represents good (ideal) disturbance rejection. In some cases, the system 110 of FIG. 2A can be designed by configuring the respective Q and inverse blocks as band-pass filters tuned to pass a selected frequency range of interest, which may be in the range of from about 500 Hz to about 10,000 Hz (10 kHz) depending on the configuration of the system.

Figure 2B:
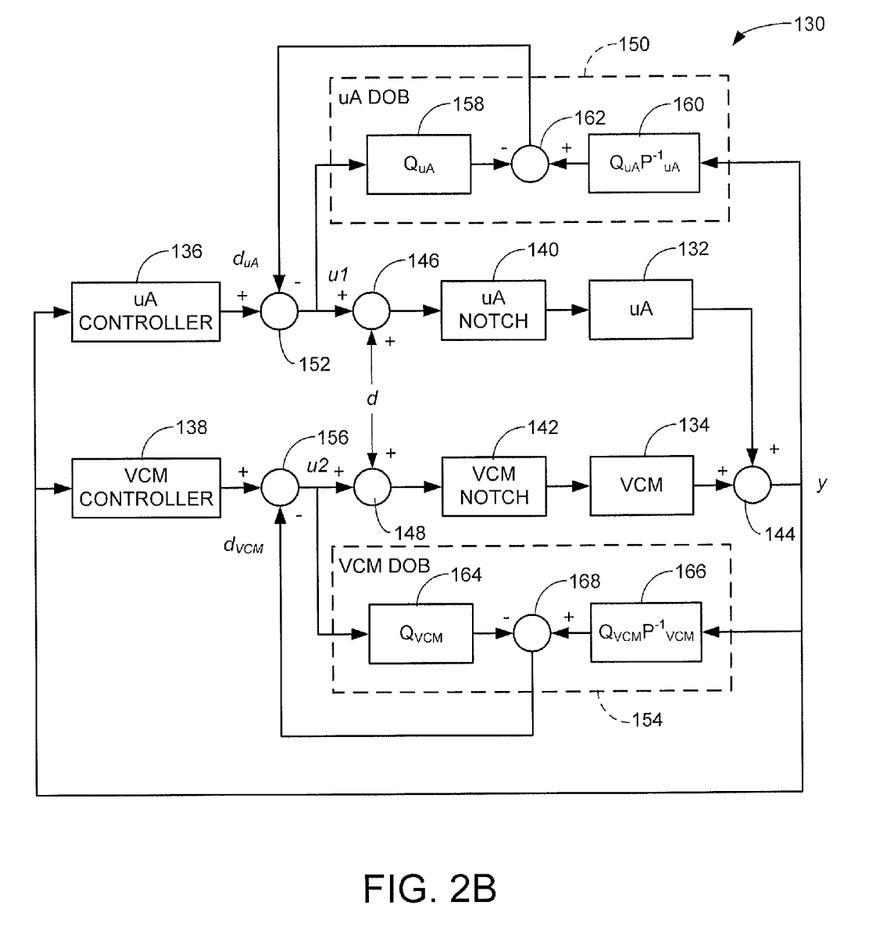
FIG. 2B is a control diagram for a multi-stage closed loop servo control circuit of the device of FIG. 1 in accordance with some embodiments.

FIG. 2B shows another closed loop control system 130 corresponding to the data storage device 100 of FIG. 1. The system 130 utilizes a multi-stage actuator (in this case, a dual stage actuator) arrangement with both a VCM (voice coil motor) 132 and a uA (microactuator) 134 coupled to position a selected transducer. Because the position output y includes the operation of both the VCM and the uA, disturbance rejection is not as straightforward as set forth by equation (1).

The system 130 includes a uA controller 136 which generates a first control signal u1 for the uA 132 and a VCM controller 138 which generates a second control signal u2 for the VCM 134. The designation of first and second control signals is arbitrary. The first and second control signals (as compensated in the manner discussed below) are supplied to respective notch filters 140, 142 which in turn supply the requisite uA 132 and VCM 134 as required.

The actual configuration of the respective plant blocks will depend on the requirements of a given application. The outputs of the actuation stages 132, 134 are summed at summing junction 144 to generate position signal y, which is fed back to the controllers 136, 138 as shown. The feedback signal may take the form of a PES. External disturbance d is injected as before into the respective control signals as represented by summing junctions 146, 148. A microactuator disturbance observer (uA DOB) 150 generates a disturbance compensation signal $d_{uA}$ which is injected into the first control signal at 152, and a voice coil motor disturbance observer (VCM DOB) 154 concurrently generates a disturbance compensation signal $d_{VCM}$ which is injected into the second control signal at 156. The uA DOB 150 includes a QUA filter block 158, an inverse uA plant ($Q_{uA}P^{-1}_{uA}$) block 160 and summing junction 162. The VCM DOB 154 includes a $Q_{VCM}$ filter block 164, an inverse uA plant ($Q_{VCM}P^{-1}_{VCM}$) block 166 and summing junction 168.

Figure 3A:
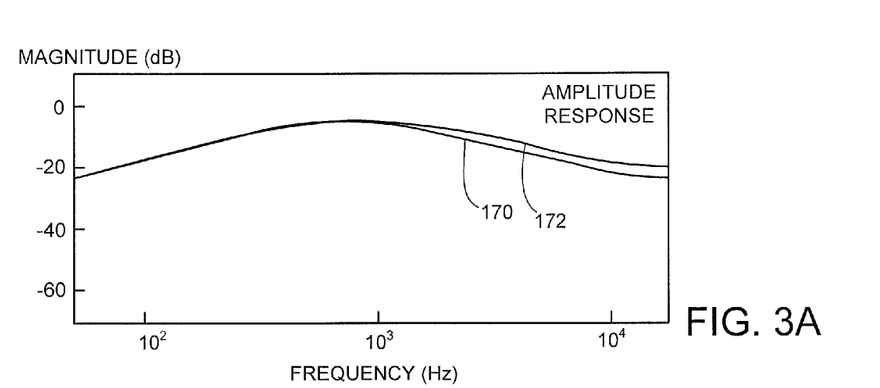
FIGS. 3A-3B show respective amplitude and phase responses of the control circuit of FIG. 2B.
Figure 3B:
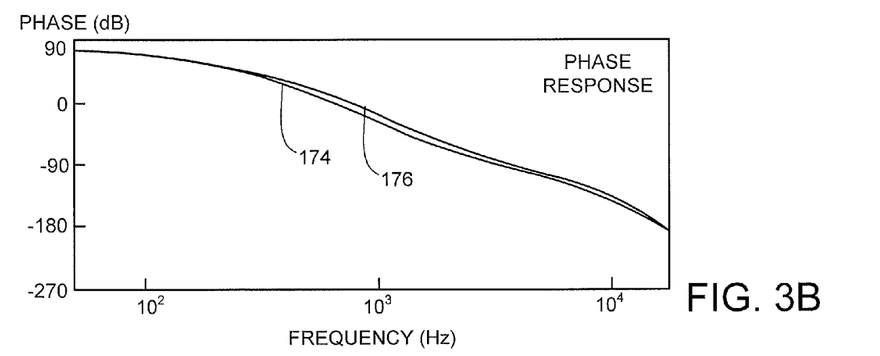
Figure 4:
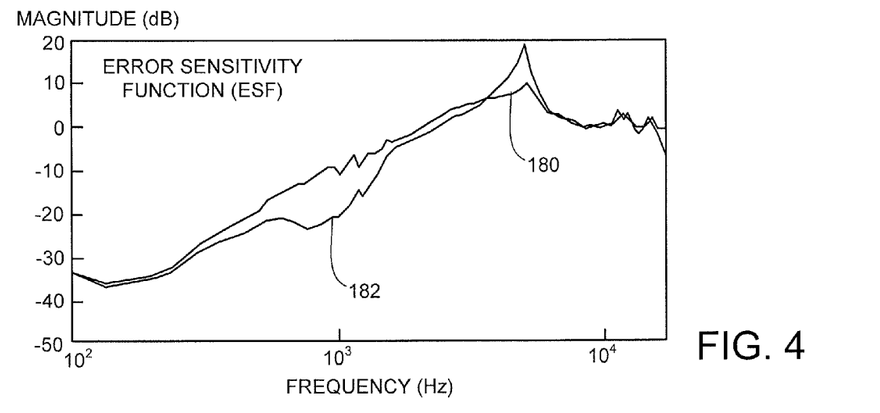
FIG. 4 shows error sensitivity function (ESF) response of the control circuit.

A problem associated with configuring the respective Q and inverse plant blocks (e.g., 158, 160, 164 and 166) as band pass filters as in FIG. 2A can be understood with a review of FIGS. 3A-3B and 4. FIGS. 3A-3B show respective amplitude and phase responses of the uA and VCM using band pass filters. Curve 170 is the amplitude response of the uA and curve 172 is the amplitude response of the VCM. Curve 174 is the phase response of the uA and curve 176 is the phase response of the VCM. It can be seen that these respective sets of curves are smooth and aligned. However, FIG. 4 shows a pair of error sensitivity function (ESF) curves 180, 182, which depict respective sensitivities to the presence of disturbance error in the system.

Curve 180 shows operation of the system 130 without disturbance rejection (thereby relying on the controllers to provide the required disturbance rejection), and curve 182 shows operation of the system 130 with the DOB circuits 150, 154 configured as band pass filters. It can be seen that while curve 182 shows improved response in one frequency range around 1000 ($10^3$) Hz, enhanced sensitivity is provided in another frequency range (around 5,000 Hz or 5 kHz). This provides graphical evidence of the waterbed effect and can result in loop instabilities for disturbances that provide excitation in this frequency range.

Figure 5:
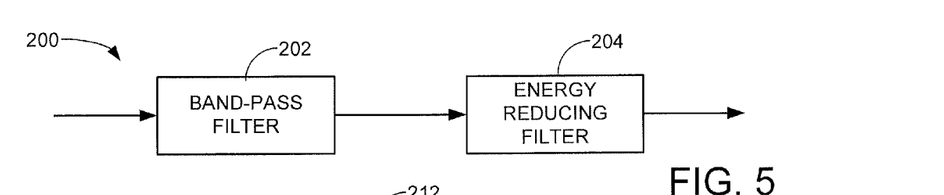
FIG. 5 provides a generalized functional block diagram of each of the filter blocks of the disturbance observers (DOB) of the control circuit of FIG. 2B.

Accordingly, FIG. 5 provides a functional block representation of a filter block 200 in accordance with various embodiments. The filter block 200 corresponds to each of the respective Q and inverse plant filters set forth above, with each block tuned accordingly as set forth below. The filter block 200 includes a band pass filter 202 and an energy reducing filter 204. Generally, the band pass filter 202 operates as described above to provide improved ESF response in a selected frequency of interest, and the energy reducing filter 204 compensates for the undesired unbalancing effects introduced into the ESF response by the band pass filter 202.

The energy reducing filter 204 can take a variety of configurations depending on the requirements of a given application. A first illustrative embodiment is provided in FIG. 6 for a filter 210 having a band pass filter 212, a series of notch filters 214 (from 1 to N), and at least one anti-notch filter 216. N can be any positive number, including one (1). It is contemplated, however, that N will be a plural number, with each notch filter tuned to a different selected frequency of interest. Moreover, while only a single anti-notch filter 216 is shown, in further embodiments multiple anti-notch filters at different frequency ranges can be applied to tailor the response of the system.

Figure 6:
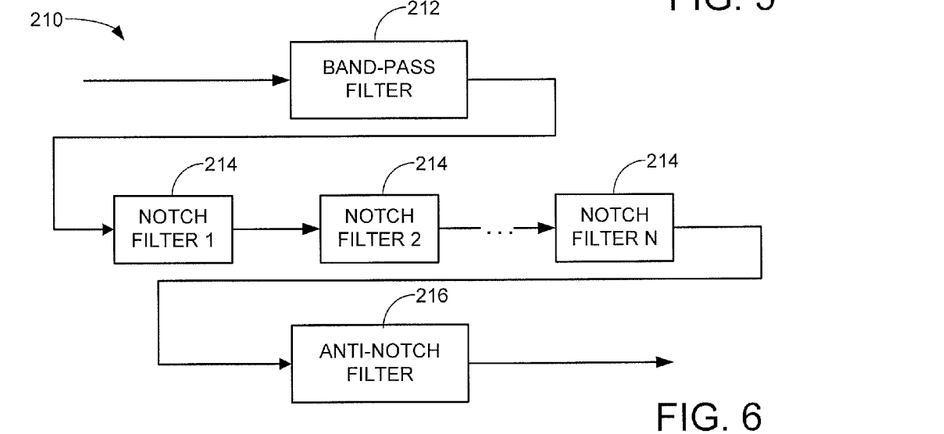
FIG. 6 is a functional block diagram of each DOB filter block in accordance with some embodiments in which one or more notch filters and anti-notch filters are used.
Figure 7:
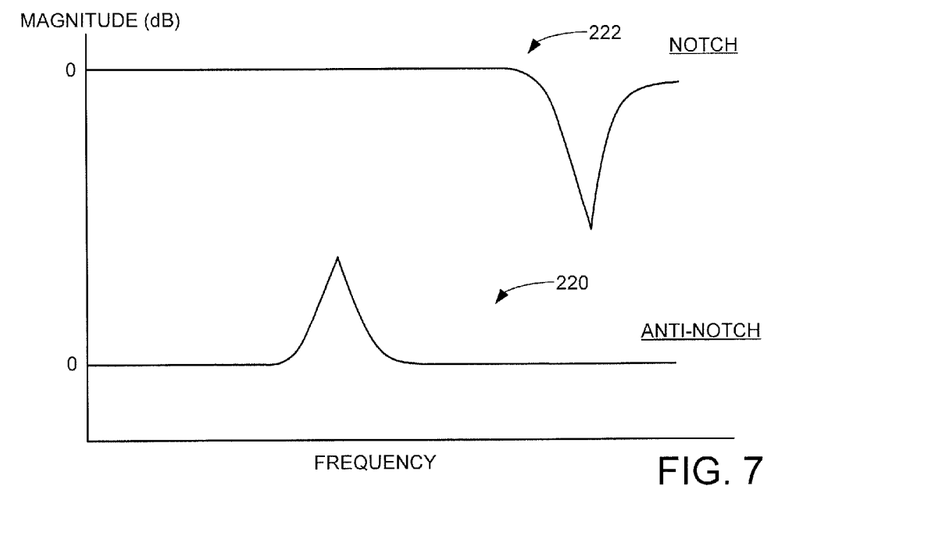
FIG. 7 are graphical representations of notch and anti-notch responses of various elements in FIG. 6.

FIG. 7 is a graphical representation of exemplary frequency responses for the respective notch filters 214 and anti-notch filters 216 in FIG. 6. Curve 220 shows a characteristic notch response for a notch filter and curve 222 shows a characteristic anti-notch response. As will be recognized by those skilled in the art, a notch filter tends to filter out a relatively narrow range (in terms of gain in decibels, dB) of frequencies and to otherwise provide little, if any, effect upon other ranges of frequencies in the input signal. Similarly, an anti-notch filter tends to provide localized gain (increase in dB) for a relatively narrow range of frequencies and otherwise has little, if any, affect upon other frequencies in the input signal.

Figure 8:
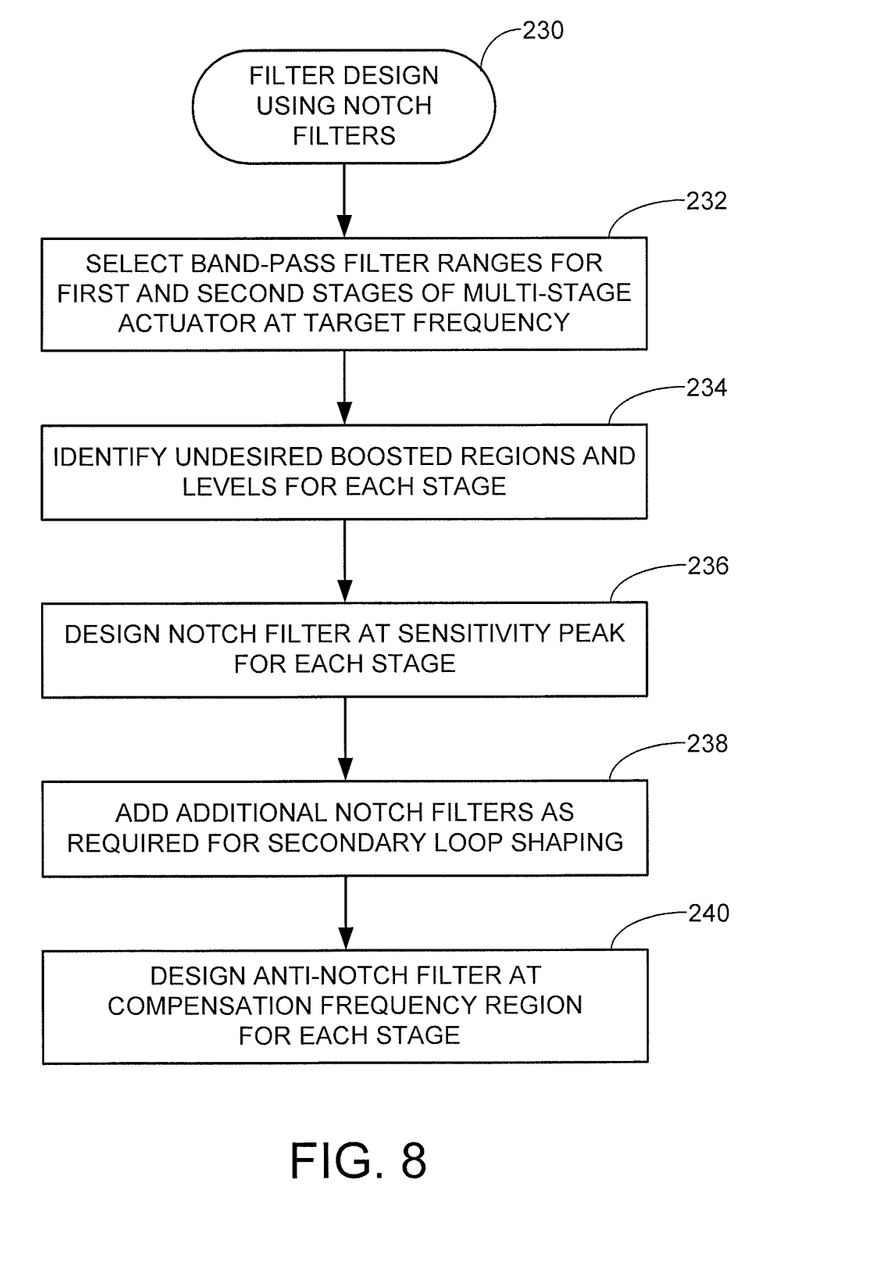
FIG. 8 is a flow chart for a filter design using notch filters routine illustrative of steps that may be carried out to configure a DOB in accordance with FIGS. 6-7.

FIG. 8 provides a flow chart for a routine 230 to design a DOB filter using notch filters as provided in FIGS. 6-7. It is contemplated that the routine can be carried out during device manufacturing or adaptively during subsequent device field use. The routine will be discussed in terms of setting the appropriate configurations for the DOB blocks 150, 154 of FIG. 2B, but the routine is not necessarily limited in this manner.

Initially, step 232 provides for the selection of appropriate band pass filters for first and second stages of a multi-stage actuator. This can be carried out as discussed above to provide suitable ranges of response based on the respective characteristics of the stages. This may provide an ESF with a suppressed region in a frequency range of interest, as well as undesired boost regions as exhibited by curve 182 in FIG. 4 due to the waterbed effect.

The boosted regions and levels for each stage are identified at step 234, and notch filters having a sensitivity peak are selected at step 236 to correspond to the frequencies at which the boosted regions appear. As noted above, multiple additional notch filters may be added as required, step 238, to provide secondary loop shaping. Finally, at least one anti-notch filter is applied at a suitable compensation frequency region to further tailor the final response, step 240.

FIGS. 9A through 16B have been provided to illustrate the operation of the routine 230 of FIG. 8 in accordance with some embodiments to configure the respective DOB filters of FIG. 2B. It will be appreciated that other solutions are contemplated and so the various graphs are merely illustrative and are not limiting. It will be appreciated that the steps can be carried out upon each of the Q filter blocks and inverse plant model blocks as required.

Figure 9A:
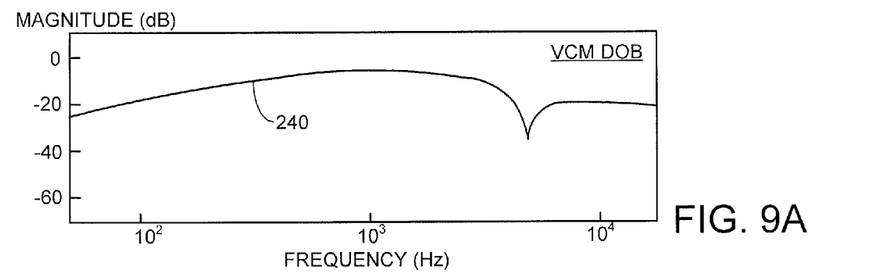
FIGS. 9A-9B show respective amplitude and phase response for a VCM (voice coil motor) DOB during the routine of FIG. 8.
Figure 9B:
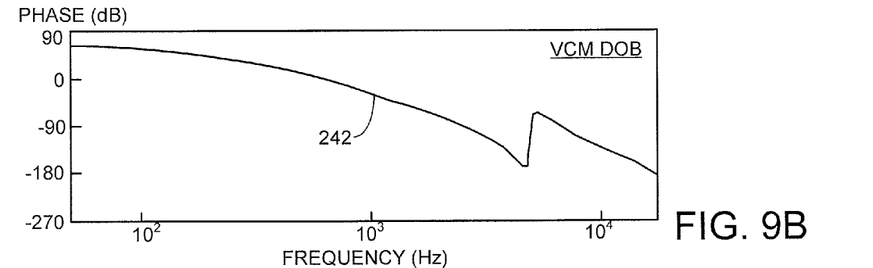

FIGS. 9A and 9B show respective amplitude and phase response curves 240, 242 for the VCM DOB 154 of FIG. 2B with the application of a suitable notch filter having a response as generally set forth at 220 in FIG. 7. The frequency of interest for the notch filter is nominally about 5 kHz, and serves to address the enhanced response in the ESF curve 182 of FIG. 4.

Figure 10A:
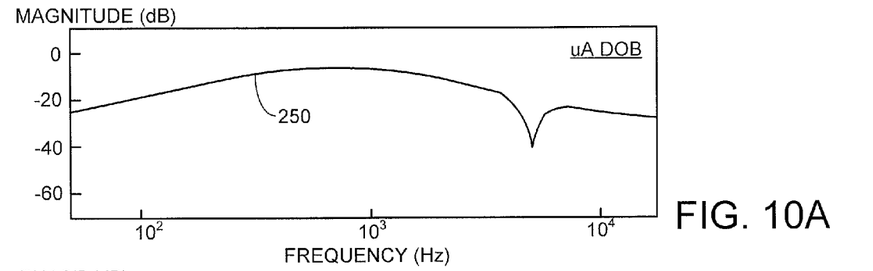
FIGS. 10A-10B show respective amplitude and phase response for a uA (microactuator) DOB during the routine of FIG. 8.
Figure 10B:
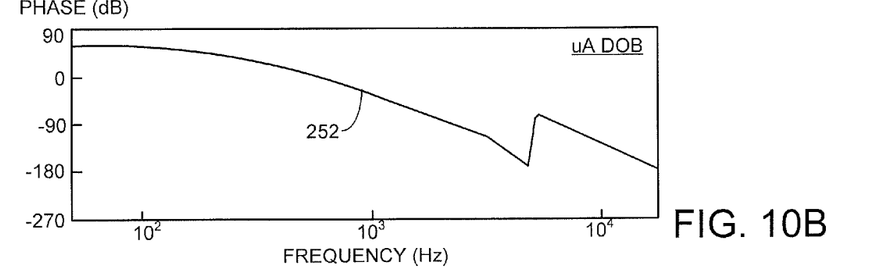

FIGS. 10A and 10B show corresponding amplitude and phase response curves 250, 252 for the uA DOB 150 of FIG. 2B using the same notch filter. These arise from the operation of step 236 in FIG. 8 and represent the DOB filtering provided with the use of a band pass filter (e.g., 212, FIG. 6) and a single notch filter 214.

Figure 11A:
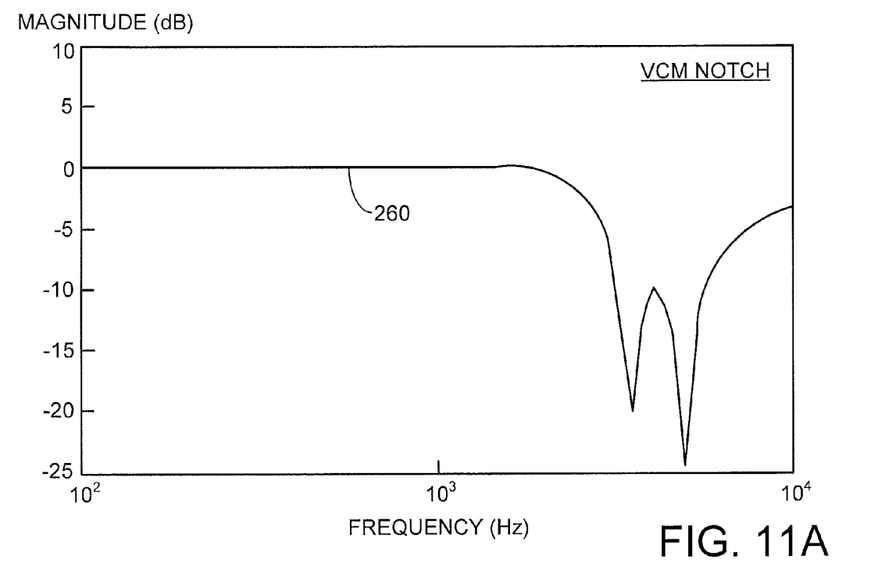
FIGS. 11A-11B show multistage notch responses during the design operation of FIG. 8.
Figure 11B:
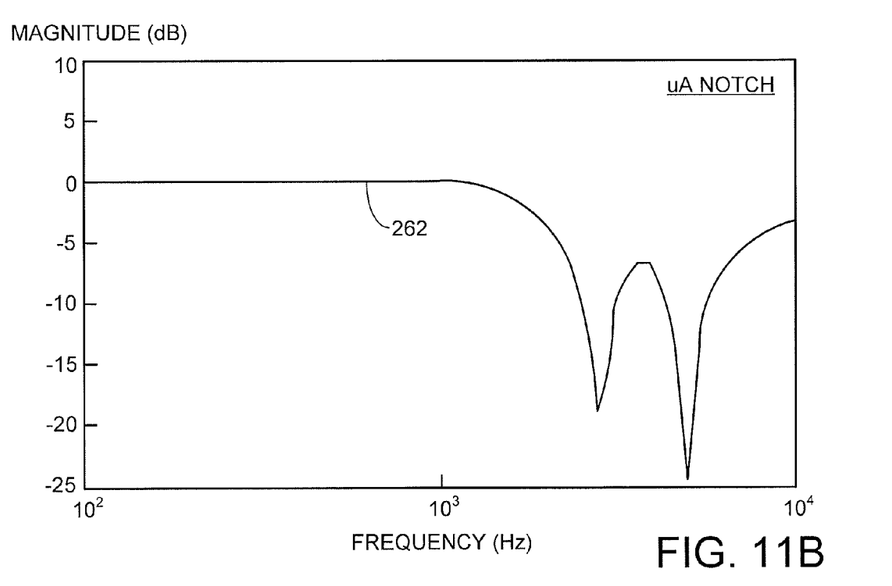

The addition of a second notch filter at a second frequency, such as about 2.8 kHz, is represented by VCM notch curve 260 in FIG. 11A and by uA notch curve 262 in FIG. 11B. The response curves are similar but nominally identical as a result of the different operational characteristics of the respective VCM and uA.

Figure 12A:
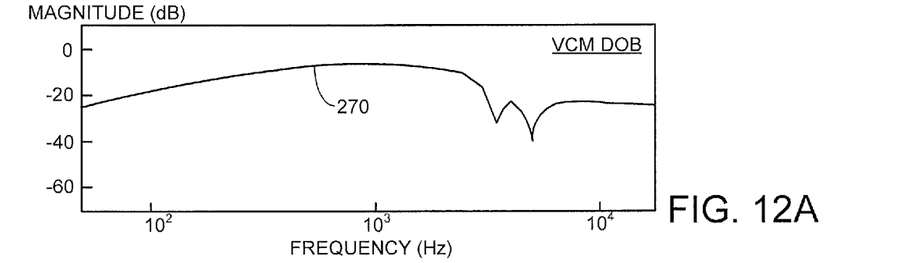
FIGS. 12A-12B show further amplitude and phase response for a VCM (voice coil motor) DOB during the routine of FIG. 8.
Figure 12B:
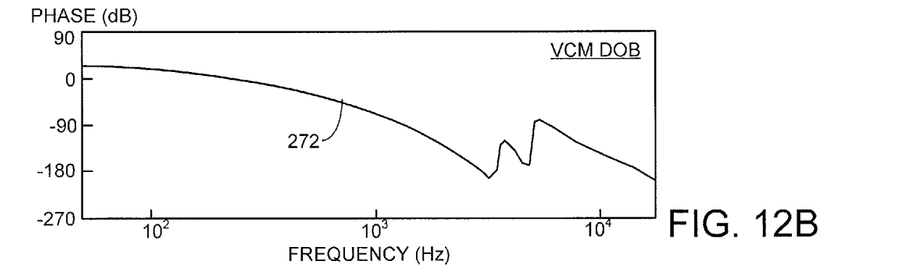
Figure 13A:
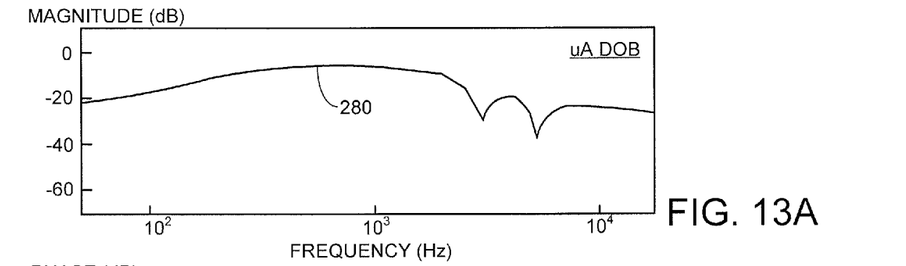
FIGS. 13A-13B show further amplitude and phase response for a uA (microactuator) DOB during the routine of FIG. 8.
Figure 13B:
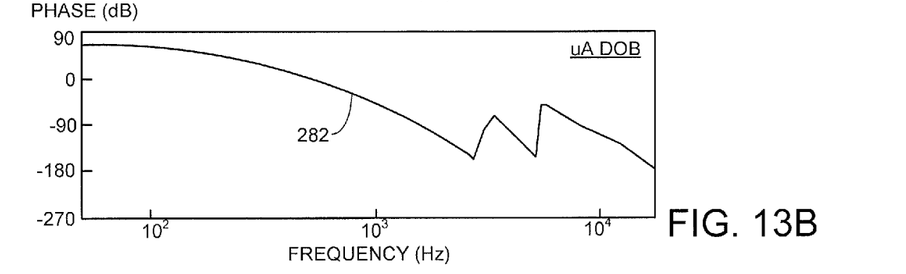

The application of the second stage of notch filters, corresponding to step 238 in FIG. 8, further tailors the amplitude and phase response of the respective VCM 134 and uA 132 as indicated by VCM response curves 270, 272 in FIGS. 12A-12B and by uA response curves 280, 282 in FIGS. 13A-13B. While only two notch filters have been added, it will be appreciated that additional notch filters can be appended to the cascade as required to tailor the final ESF to a suitable level over all desired frequencies.

Figure 14A:
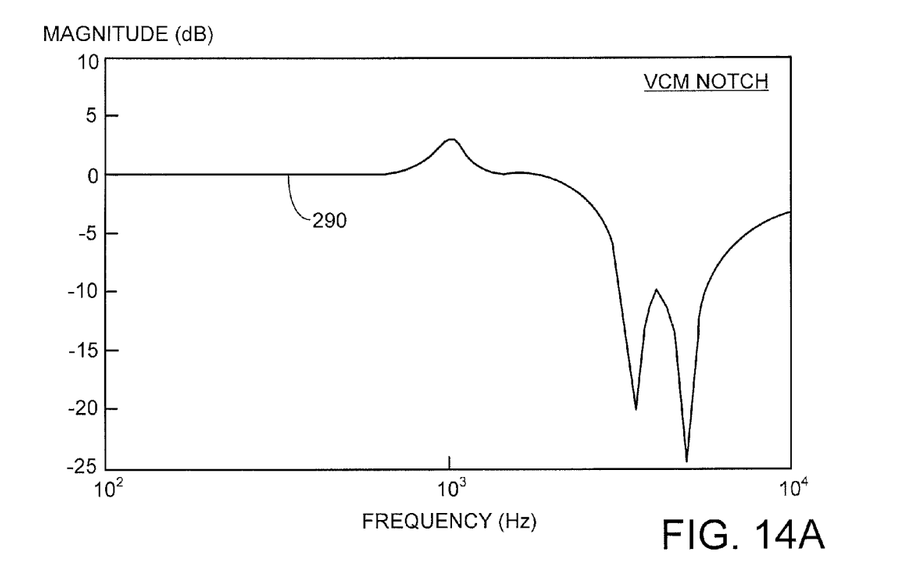
FIGS. 14A-14B show further multistage notch and anti-notch responses during the design operation of FIG. 8.
Figure 14B:
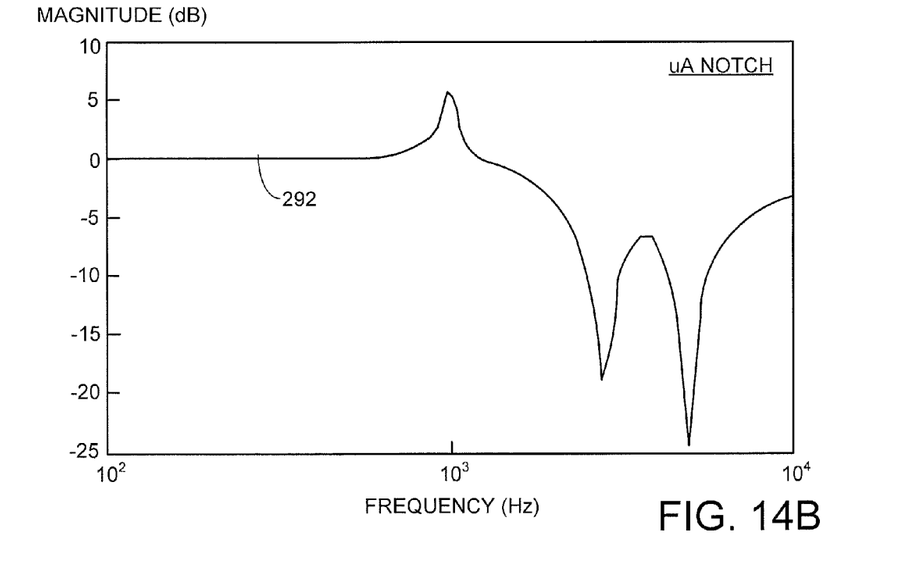
Figure 15A:
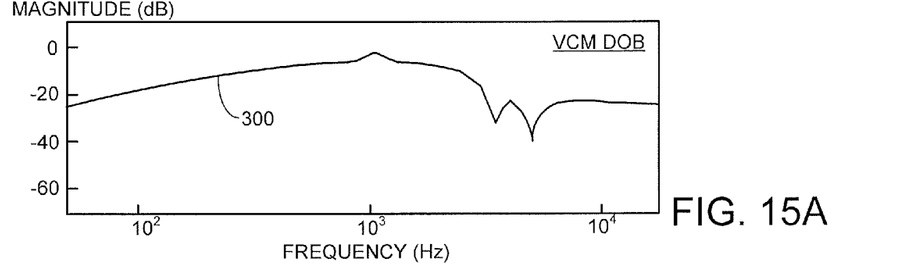
FIGS. 15A-15B show final amplitude and phase response for a VCM (voice coil motor) DOB during the routine of FIG. 8.
Figure 15B:
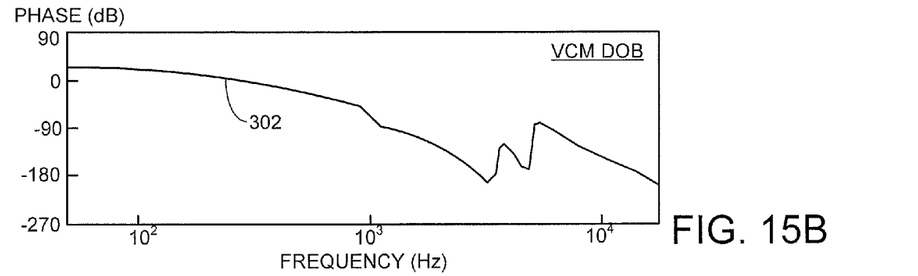
Figure 16A:
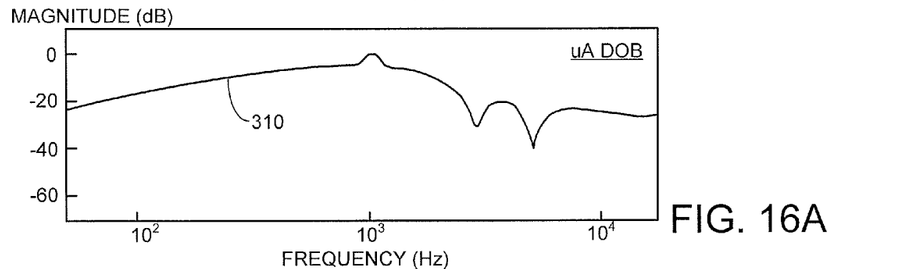
FIGS. 16A-16B show further amplitude and phase response for a uA (microactuator) DOB during the routine of FIG. 8.
Figure 16B:
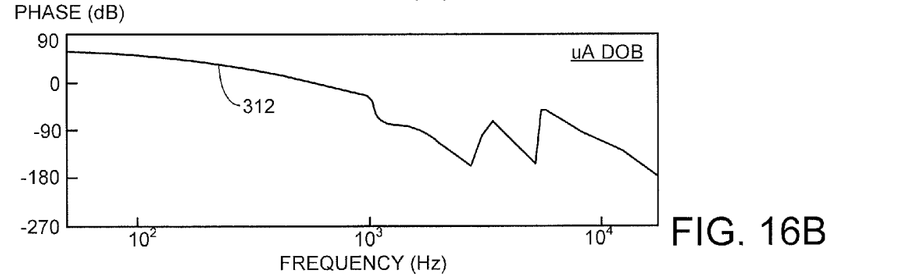

An anti-notch filter is further added as shown by VCM and uA response curves 290, 292 in FIGS. 14A and 14B. The notch-filter is set at a frequency generally corresponding to the compensation range addressed by the band pass filter, and may be in the range of from about 500-1000 Hz, or some other suitable range. This operation generally corresponds to step 238 in FIG. 8 and provides final VCM amplitude and phase response curves 300, 302 in FIGS. 15A-15B and final uA amplitude and phase response curves 310, 312 in FIGS. 16A-16B.

It is contemplated that the final filter configuration will provide good disturbance rejection over the selected range of interest, and can accommodate a wide variety of different unpredictable disturbance profiles. The various filters can be programmed and implemented using firmware/software programming using a programmable controller. In some cases, different sets of filter parameters to configure the respective filters can be stored and recalled for different head/media combinations, different temperatures, different sensed environments, etc. The filter parameters can be adaptively changed over time based on selected inputs, such as excessive levels of off track errors, bit error rates (BER), etc.

The same styles, types and numbers of filter elements (e.g., the same notch filters, the same anti-notch filters, etc.) may be supplied for both the uA DOB 150 and the VCM DOB 154 (see FIG. 2B). For example, each of the respective Q filters 158, 164 may be nominally identical or these may be supplied with individually tuned filter characteristics. Similarly, the inverse plan models 160, 166 can be configured to be nominally identical or these may be supplied with individually tuned filter characteristics.

Figure 17:
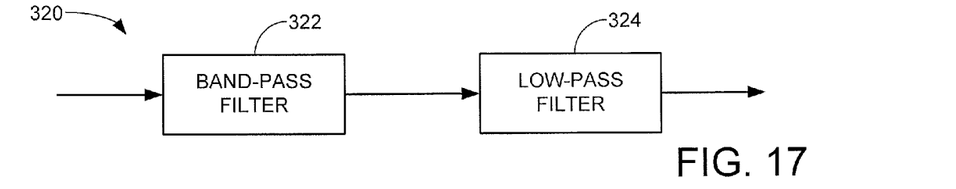
FIG. 17 is an alternative configuration for each of the filter blocks of the DOBs in further embodiments in which one or more low-pass filters (LPF) are used.
Figure 18:
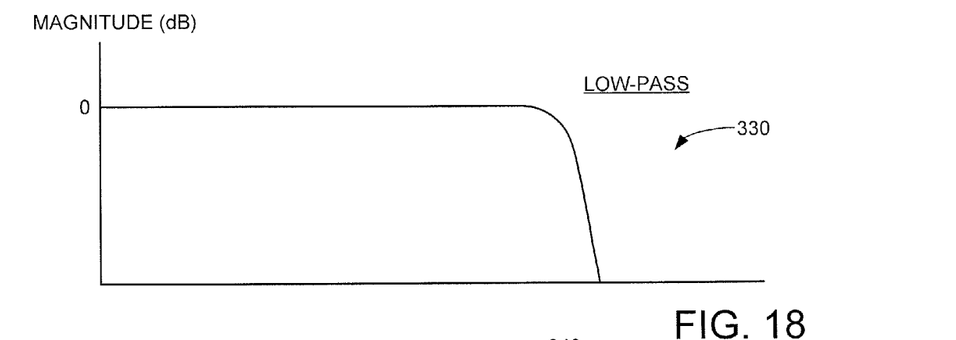
FIG. 18 is a graphical representation of a low pass filter response of the LPF of FIG. 17.

FIG. 17 is a functional block diagram for another configuration for the various DOB blocks of FIG. 2B. Instead of using a series of notch filters and anti-notch filters as in FIG. 6, a filter block 320 in FIG. 17 uses a band pass filter 322 and at least one low-pass filter (LPF) 324. In some embodiments, the LPF 324 is a first order LPF with a characteristic response 330, as generally illustrated in FIG. 18. Other configurations are contemplated including higher order LPF circuits.

As will be recognized, an LPF generally operates to allow passage of frequency components of an input signal below a selected frequency, and to generally impede the passage of frequency components in the input signal above the selected frequency, as indicated by the general shape of curve 330. In some cases, the band pass filter 322 may have a similar response as the LPF 324 except that the band pass filter 322 may have multiple cut off frequencies and gain levels, as required.

Figure 19:
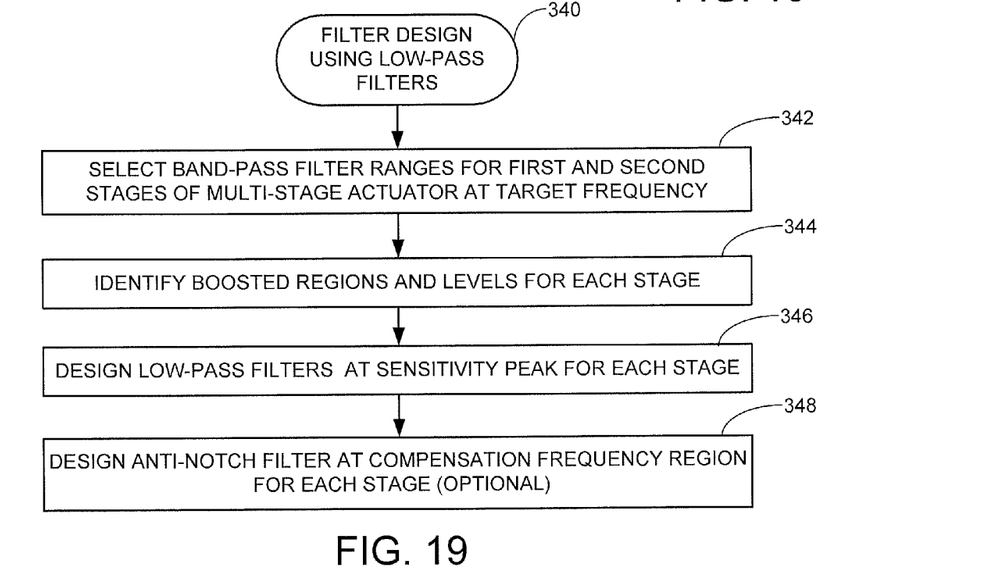
FIG. 19 is a flow chart for a filter design using low pass filters routine illustrative of steps that may be carried out to configure a DOB in accordance with FIGS. 17-18.

FIG. 19 provides a routine 340 for a filter design process using low-pass filters as in FIGS. 17-18. As before, the routine 340 will be described using the circuit 130 of FIG. 2B as an illustrative example, although the routine is not so limited. It is therefore contemplated that the multi-stage actuator is a dual stage actuator for a data storage device 100 having a VCM and uA.

At step 342, suitable band-pass filter ranges are selected for the first and second stages of the multi-stage actuator at a target frequency. Generally, this operation may be similar to that carried out at step 232 in FIG. 8. As before, the addition of the band pass filters to the DOB blocks will tend to provide reduced error sensitivity in the ESF response at selected frequencies, but may also tend to boost error sensitivity at other frequencies. Such boosted regions are identified at step 344, and one or more suitable low-pass filters are configured at step 346 having a sensitivity peak at an appropriate frequency corresponding to the boosted regions.

In some cases, a simple DOB filter block having a band-pass filter and a low-pass filter may be sufficient to provide adequate disturbance rejection, as depicted in FIG. 17. In other cases, as desired one or more anti-notch filters can be added to the design, as indicated at step 348, to provide compensation at selected frequency ranges to further tailor the final response.

Figure 20A:
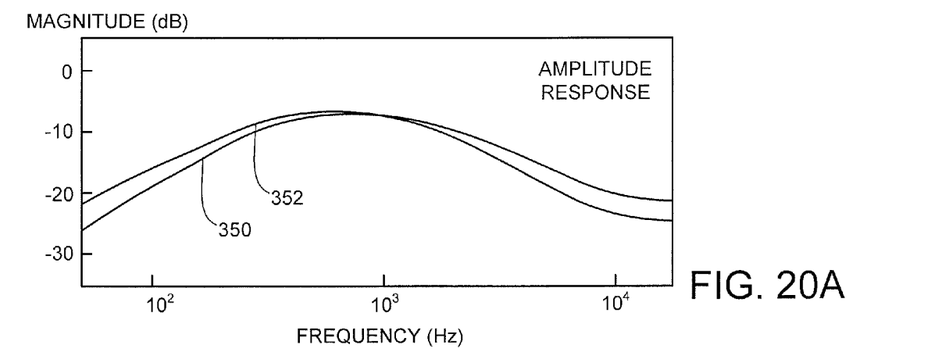
FIGS. 20A-20B show respective amplitude and phase response for the VCM and uA DOB filters during the routine of FIG. 19.
Figure 20B:
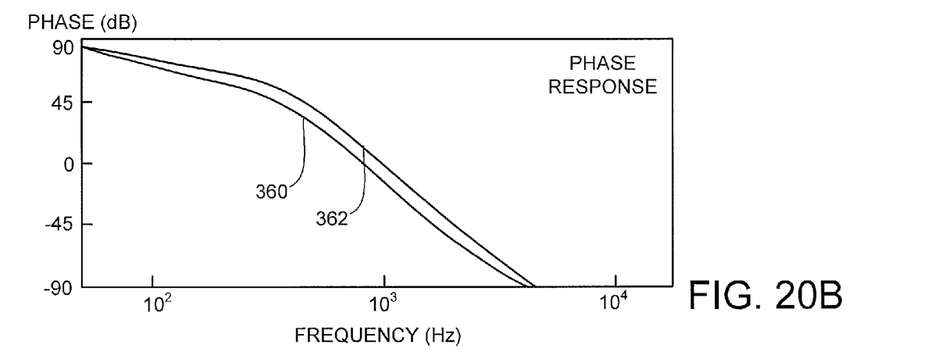
Figure 21:
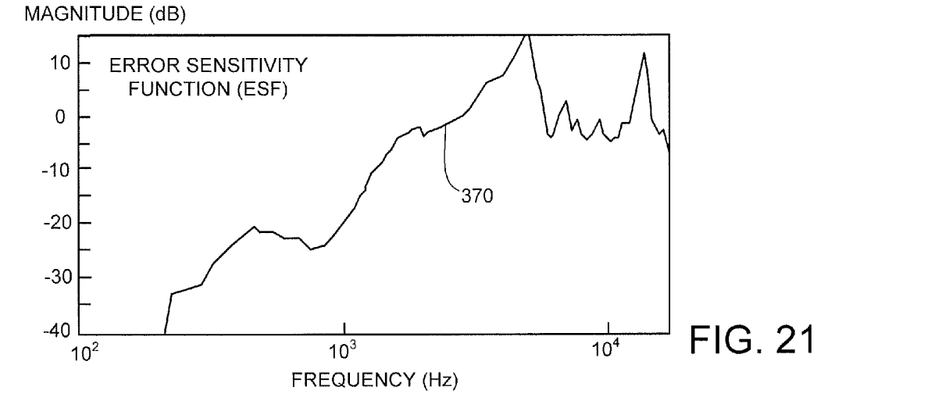
FIG. 21 is an error sensitivity function (ESF) response corresponding to FIGS. 20A-20B.

The use of the band pass filters as selected at step 342 in FIG. 19 are illustrated in FIGS. 20A-20B and 21. FIG. 20A provides respective amplitude response curves 350, 352 for the VCM and uA DOB filters, and FIG. 20B shows corresponding phase response curves 360, 362 for the VCM and uA DOB filters. As before, the respective curves have similar shapes and response characteristics. FIG. 21 provides an error sensitivity function (ESF) response curve 370, which indicates that a lower frequency range is compensated by the band-pass filter (e.g., in the area of around 1 kHz) but excessive sensitivity is provided around 5 kHz.

Figure 22A:
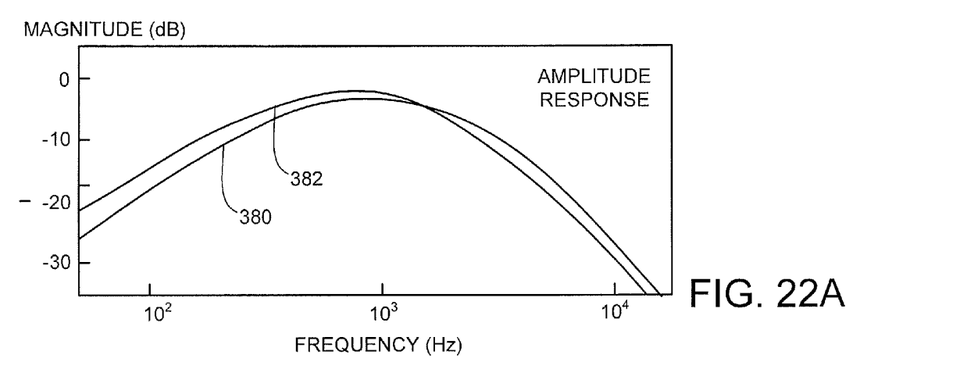
FIGS. 22A-22B show further respective amplitude and phase response for the VCM and uA DOB filters during the routine of FIG. 19.
Figure 22B:
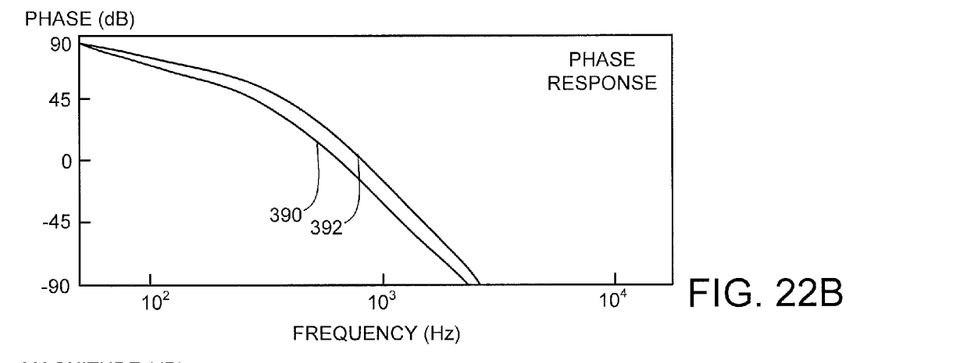
Figure 23:
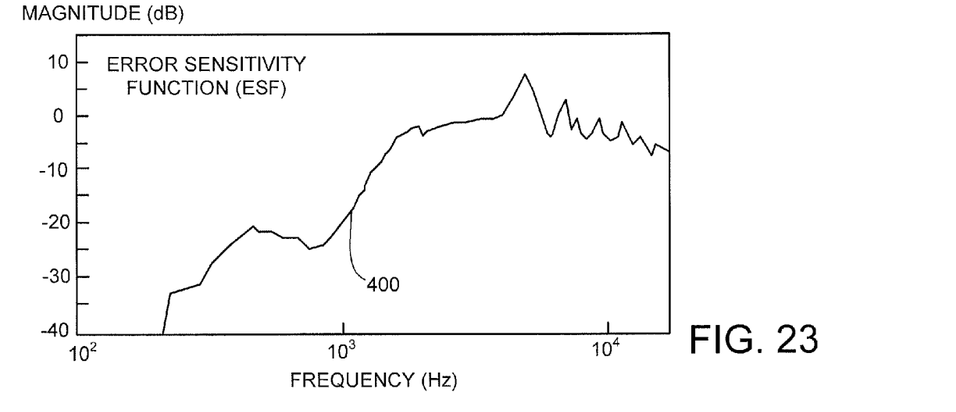
FIG. 23 is an ESF response corresponding to FIGS. 22A-22B.

Accordingly, suitable low-pass filters are selected and incorporated into the DOB filter blocks, as discussed above at step 346. FIG. 22A provides respective amplitude response curves 380, 382 for the VCM and uA DOB filters, and FIG. 22B shows corresponding phase response curves 390, 392 for the VCM and uA DOB filters. The addition of the low-pass filters does not significantly change the shape and correspondence of the respective curves. However, FIG. 23 shows an improved ESF response curve 400 which, as a result of the higher frequency cutoff supplied by the LSFs, significantly reduces the error sensitivity in the boosted region around 5 kHz.

Although not shown in the drawings, the filter design could be augmented with additional stages, including the application of one or more anti-notch filters as indicated at step 348 in FIG. 19, to further tailor the final response and enhance system disturbance rejection capabilities.

It will now be appreciated that the various embodiments disclosed herein may provide a number of benefits. Providing multiple DOB filters with band pass and energy reducing stages can address the unbalanced issues that sometimes arise through the use of DOB models with multi-stage actuators. While a data storage environment (e.g. HDD environment) has been presented for purposes of providing a concrete example, the techniques disclosed herein can be readily adapted to any number of commercial and industrial applications in which a control object is positioned by a multi-stage actuator, including but not limited to the field of automated equipment in which robotic end effectors are manipulated to control the position of a control object.

Embodiments of the present disclosure have been described with particular reference to the examples illustrated. However, it will be appreciated that variations and modifications may be made to the examples described within the scope of the present disclosure.

What is claimed is:

1. An apparatus comprising:
   a first disturbance observer (DOB) circuit configured to inject a first disturbance rejection signal into an input control signal of a first stage of a multi-stage actuator using a first summing junction; and
   a second DOB circuit configured to concurrently inject a second disturbance rejection signal into an input control signal of a second stage of the multi-stage actuator using a second summing junction, each of the first and second DOB circuits comprising a band pass filter and an energy reducing filter comprising at least a selected one of a notch filter or a low pass filter.

2. The apparatus of claim 1, wherein the band pass filter passes a selected frequency component of interest of an input signal and the energy reducing filter is arranged in series with the band pass filter to reduce an increase in error sensitivity induced by the band pass filter.

3. The apparatus of claim 1, wherein the energy reducing filter comprises at least one notch filter and an anti-notch filter.

4. The apparatus of claim 3, wherein the energy reducing filter comprises a plurality of serially connected notch filters downstream of the band pass filter each providing frequency rejection at a different selected frequency of interest.

5. The apparatus of claim 3, wherein the anti-notch filter is in series with the notch filter and the band pass filter, the anti-notch filter increasing error sensitivity in a frequency range passed by the band pass filter.

6. The apparatus of claim 1, wherein the energy reducing filter comprises a low-pass filter (LPF) and does not include a notch filter.

7. The apparatus of claim 6, further comprising an anti-notch filter in series with the LPF, the anti-notch filter increasing error sensitivity in a frequency range passed by the band pass filter.

8. The apparatus of claim 1, wherein the first stage is a voice coil motor (VCM) and the second stage is a microactuator (uA).

9. The apparatus of claim 1, further comprising a first controller circuit configured to generate the input control signal for the first stage responsive to a combined position signal generated responsive to an output of the first stage and an output of the second stage, wherein the input control signal and the combined position signal are supplied as respective inputs to the first DOB circuit.

10. The apparatus of claim 9, wherein the input control signal is provided to a Q filter block of the first DOB circuit, the combined position signal is provided to an inverse plant model block of the first DOB circuit, the output of the Q filter block is combined with the output of the inverse plant model block to generate the first disturbance compensation signal, the Q filter block comprising the band pass filter and the energy reducing filter.

11. The apparatus of claim 10, wherein the inverse plant model block comprises a second band pass filter and a second energy reducing filter.

12. A data storage device comprising:
    a dual stage actuator comprising a voice coil motor (VCM) and a microactuator (uA) configured to position a data transducer adjacent a recording medium;
    a VCM controller circuit configured to generate a VCM control input signal for the VCM;
    a uA controller circuit configured to generate a uA control input signal for the uA;
    a VCM disturbance observer (DOB) circuit configured to inject a first disturbance rejection signal into the VCM control input signal using a first summing junction to compensate disturbance components in a combined position signal generated by the VCM and the uA, the VCM DOB circuit comprising a first band pass filter in series with a first energy reducing filter that reduces error sensitivity of the combined position signal induced by the first band pass filter, the first energy reducing filter comprising a plurality of serially connected notch filters; and
    a uA disturbance observer (DOB) circuit configured to inject a second disturbance rejection signal into the uA control input signal using a second summing junction to compensate disturbance components in the combined position signal, the uA DOB circuit comprising a second band pass filter in series with a second energy reducing filter that reduces error sensitivity of the combined position signal induced by the second band pass filter, the second energy reducing filter comprising a plurality of serially connected notch filters.

13. The data storage device of claim 12, wherein the combined position signal is a position error signal (PES).

14. The data storage device of claim 12, wherein the first and second energy reducing filters each further comprise at least one anti-notch filter.

15. The data storage device of claim 12, wherein the first and second energy reducing filters each comprise at least one anti-notch filter in series with the plurality of serially connected notch filters.

16. The data storage device of claim 12, wherein each of the first and second DOB circuits comprise a Q filter and an inverse plant model filter.

17. A method comprising:
providing a multi-stage actuator having at least first and second actuator stages;
designing a first disturbance observer (DOB) circuit for the first actuator stage and a second DOB circuit for the second actuator stage, each of the first and second DOB circuits configured to compensate for disturbance error in a combined position signal from the first and second stages and each comprising a band pass filter selected to pass frequency values of interest in the combined position signal and an energy reducing filter in series with the band pass filter selected to reduce an increase in an error sensitivity function response induced by the band pass filter, each of the enemy reducing filters comprising a low pass filter; and
programming a programmable controller to implement the first and second DOB circuits during operation of the multi-stage actuator using first and second summing junctions to inject respective first and second disturbance compensation signals into the combined position signal.

18. The method of claim 17, further comprising generating an input control value for at least a selected one of the first and second actuator stages, and injecting a disturbance compensation value from the at least one of the first and second DOB circuits into the input control value.

19. The method of claim 16, wherein the first and second actuator stages respectively comprise a voice coil motor (VCM) and a microactuator (uA).

20. The method of claim 16, wherein the energy reducing filter further comprises an anti-notch filter.

* * * * *

UNITED STATES PATENT AND TRADEMARK OFFICE
CERTIFICATE OF CORRECTION

PATENT NO. : 9,601,143 B1
APPLICATION NO. : 14/839501
DATED : March 21, 2017
INVENTOR(S) : Sangbo Seo and Sung Won Park It is certified that error appears in the above-identified patent and that said Letters Patent is hereby corrected as shown below:

In Column 11, Line 17:
"enemy" should be "energy"

Signed and Sealed this
Eighth Day of August, 2017

Joseph Matal
*Performing the Functions and Duties of the*
*Under Secretary of Commerce for Intellectual Property and*
*Director of the United States Patent and Trademark Office*